United States Patent [19]

Paping et al.

[11] Patent Number: 4,540,196
[45] Date of Patent: Sep. 10, 1985

[54] FOLDING CADDY

[75] Inventors: Max G. Paping, Culemborg; Bjørn O. Goossens, Wassenaar, both of Netherlands

[73] Assignee: Maxilin B.V., Barneveld, Netherlands

[21] Appl. No.: 466,205

[22] Filed: Feb. 14, 1983

[30] Foreign Application Priority Data

Feb. 19, 1982 [NL] Netherlands ............... 8200687

[51] Int. Cl.³ ................................. B62B 11/00
[52] U.S. Cl. ........................ 280/646; 280/639; 280/652
[58] Field of Search ........... 280/646, 639, 40, 645, 280/651, 652

[56] References Cited

U.S. PATENT DOCUMENTS 3,666,283  5/1972  Stevens et al. ............ 280/645
3,831,958  8/1974  Keaton .................... 280/646
4,294,463 10/1981  Kotani .................... 280/646

Primary Examiner—Richard A. Bertsch
Attorney, Agent, or Firm—Cook, Wetzel & Egan, Ltd.

[57] ABSTRACT

A folding caddy comprising a foldable bottom consisting of at least two bottom members with wheels attached thereto, a handle for pushing or pulling the device, and a rear wall which is also foldable and consists of at least two rear-wall members. The rear-wall members are hinged to wheel guards and the bottom is, on opposite sides, also hinged to the wheel guards.

17 Claims, 10 Drawing Figures

FOLDING CADDY

The invention relates to a folding caddy comprising a supporting bottom with wheels attached thereto, and a handle for pulling or pushing the device.

When a known caddy of this kind is folded, its parts are so moved relatively to each other that a relatively large packet is formed, which is placed in the appurtenant shopping bag, which is also large. The width of the bag is necessarily equal to the width of the caddy in its operative position. In this known device, the bag is an essential part of the caddy.

It is an object of the invention to eliminate the drawbacks referred to, and to provide a caddy which in the folded condition has the dimensions of a wrist bag, and can be taken along as such.

For this purpose the caddy according to the invention is characterized by a foldable, at least two-membered rear wall, which members are each hinged to wheel guards, the likewise foldable and at least two-membered bottom being on opposite sides also hinged to said wheel guards.

In addition the rear wall members may each by themselves be foldable.

The rear wall members may be foldable about a sloping hinge line, so that in the folded condition of the caddy, the bottom members, the rear wall members, and the wheel guards are substantially parallel.

A further reduction in size of the folded caddy is obtained if the handle is of foldable or telescoping construction.

In order to ensure that the caddy is capable of atanding upright in its operative condition, the bottom end of the handle may be provided with a support member which, in the operative condition, extends under the bottom. When the support member is made extensible, the caddy can also serve for the transportation of articles having a larger bottom surface than the usual shopping bags, for example crates. An additional support can be provided by providing the handle at its lower end with a second support member pivoted to it.

In order that suitcases or like large objects may also be easily transported with the caddy according to the invention, the top surfaces of the wheel guards may be made at least in part of flat configuration.

In order to ensure that the caddy can be quickly and correctly moved into its operative condition and maintained therein, the hinge joint between each rear wall member and the handle may be formed with a stop.

The caddy may be made predominantly of synthetic plastics material. In that embodiment the hinges may be of polypropylene or like material.

In order that the caddy may be folded to as narrow a size as possible, each wheel guard may be provided with a recess or an off-set portion for receiving the corresponding portion of the rear wall member when the caddy is folded together. This effect can be enhanced still further by providing each bottom member with a recess or offset portion for receiving a corresponding portion of the rear wall member when the caddy is folded together.

It is also possible for the caddy to be made predominantly of metal wire or the like. In such a caddy the handle may extend up to the front of the bottom, and the bottom may be pivoted to it. In this embodiment the rear wall may comprise two connecting rods, each pivoted on one end to the respective wheel guard, and at the other end to the handle, and of two tie-rods, each at one end connected in sliding fashion with said handle, and pivoted at the other end to the respective bottom member.

In a further elaboration of the invention the caddy may be associated with a bag to be secured to the handle, said bag having a compartment for accommodating the folded caddy.

The caddy according to the invention has the advantage that crates can be easily transported with it as well.

For clarifying the invention, some embodiments of the folded caddy will now be described, by way of example, with reference to the drawings. In said drawings:

FIGS. 1a, 1b and 1c show, on an enlarged scale, details of the caddy illustrated in FIG. 1;

Figure 1:
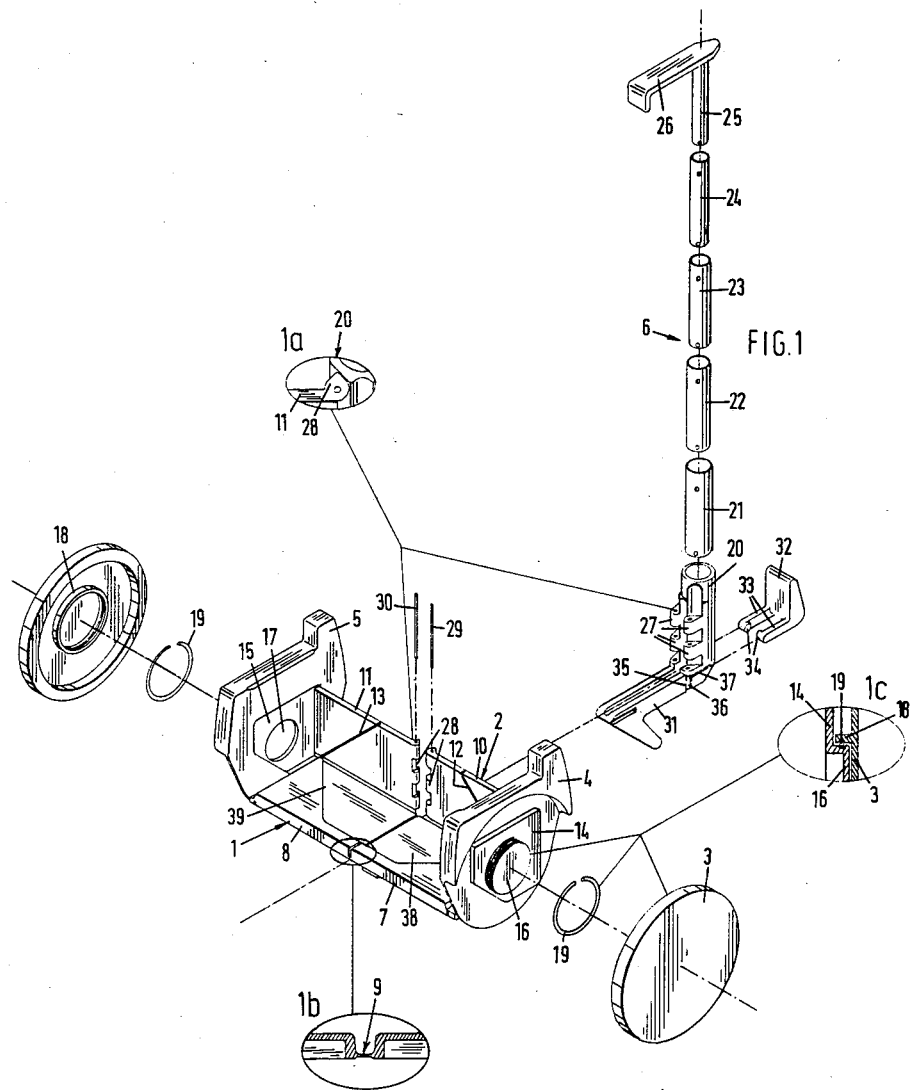
FIG. 1 shows a foldable caddy in the non-folded condition, in exploded view.
Figure 2:
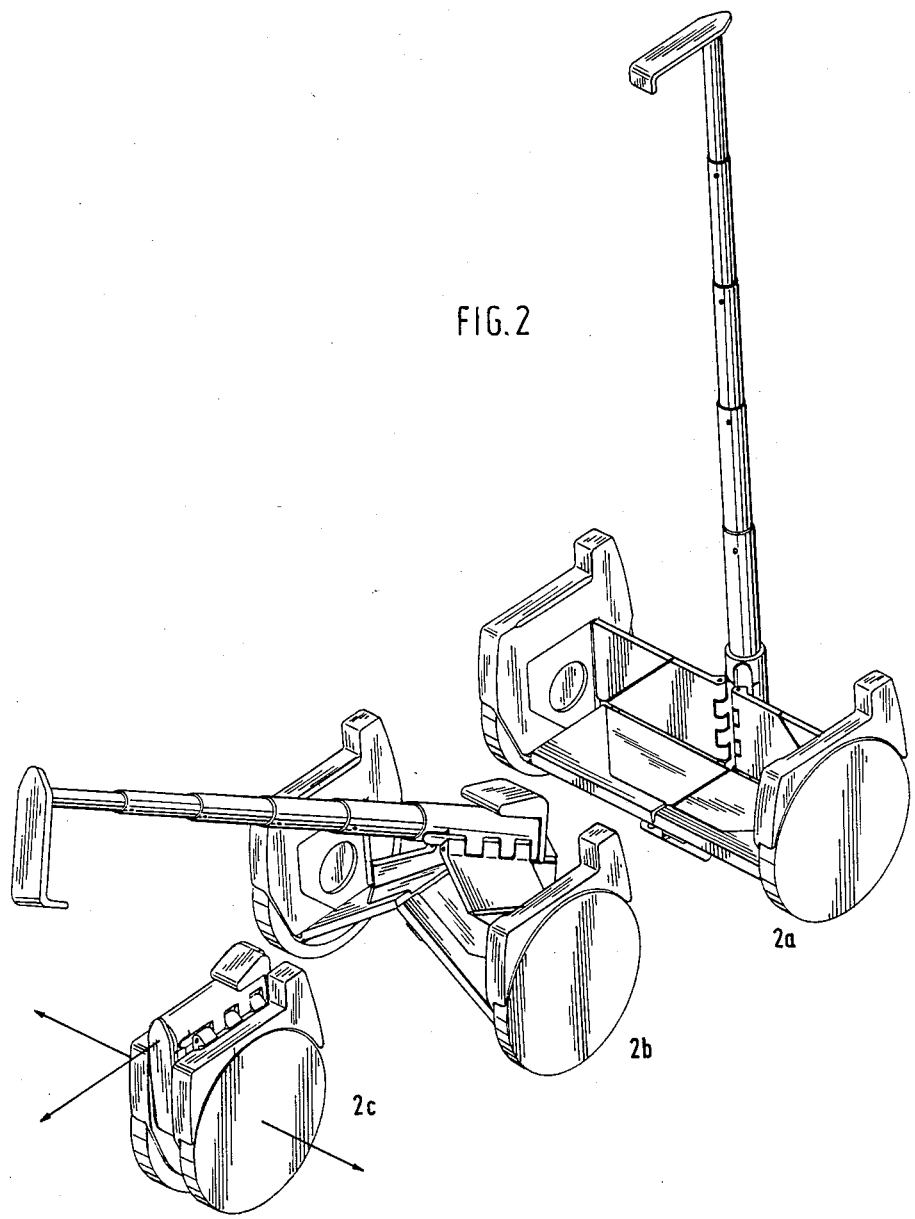
Figure 3:
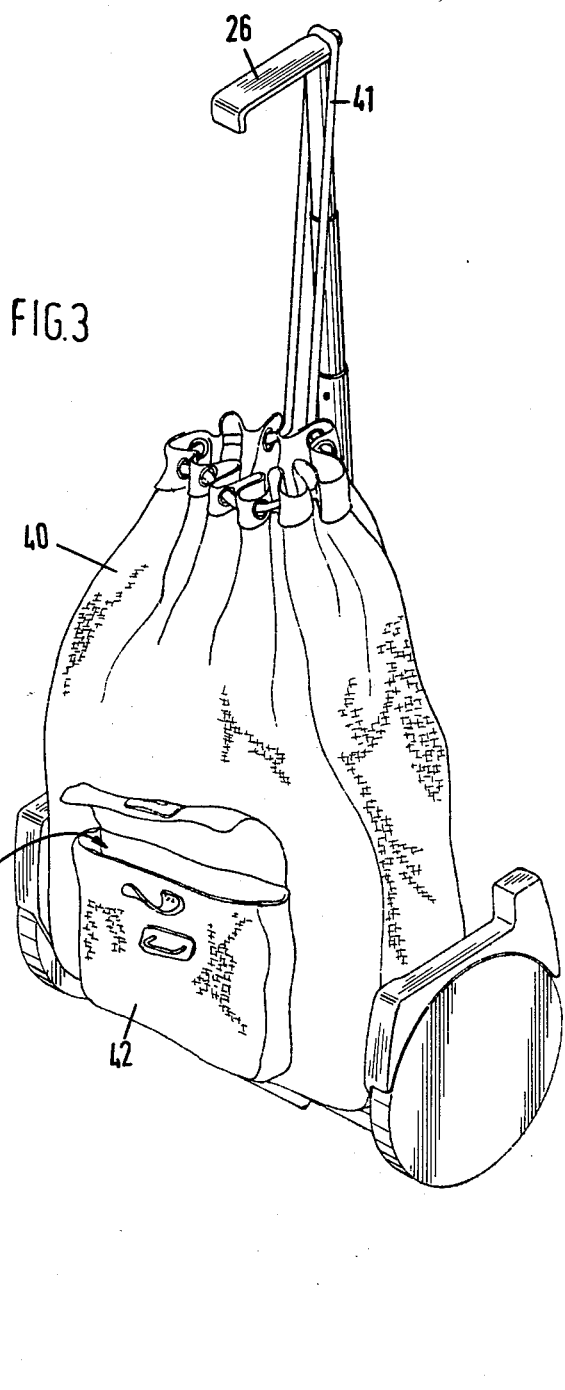
Figure 4:
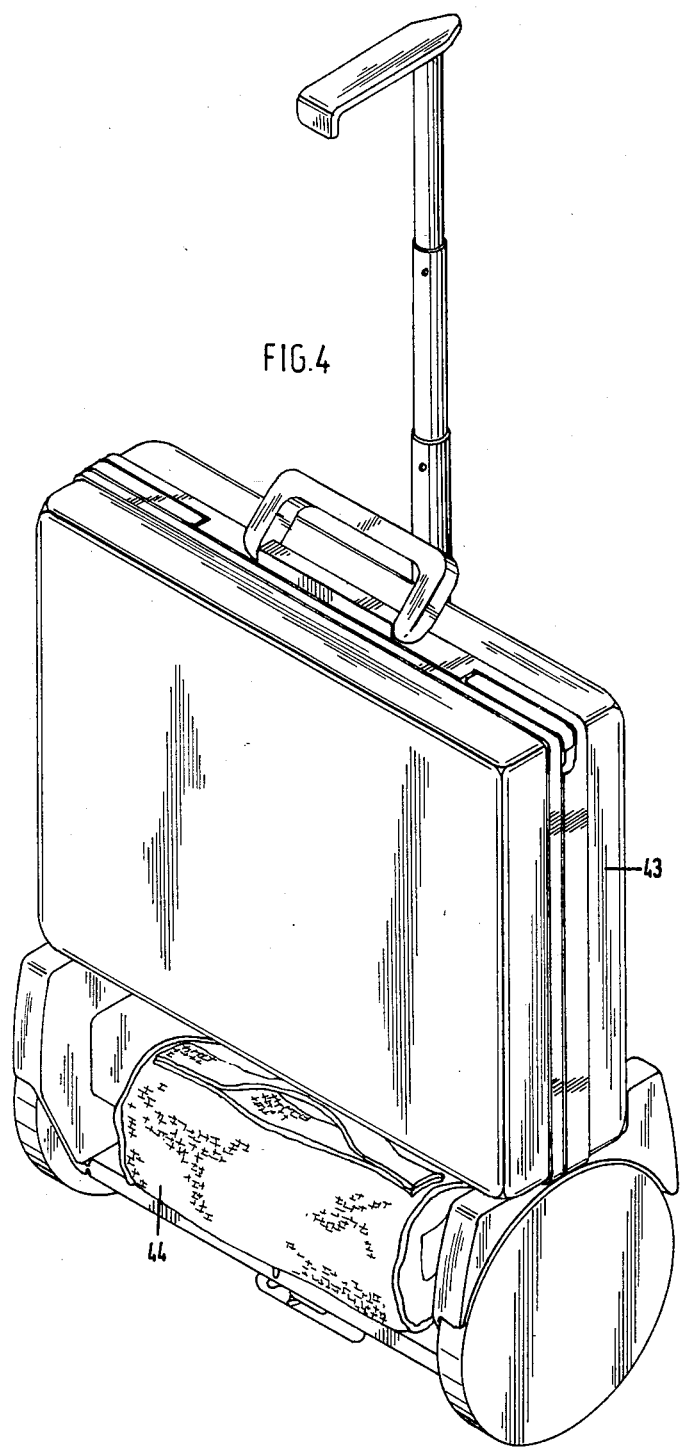
Figure 5:
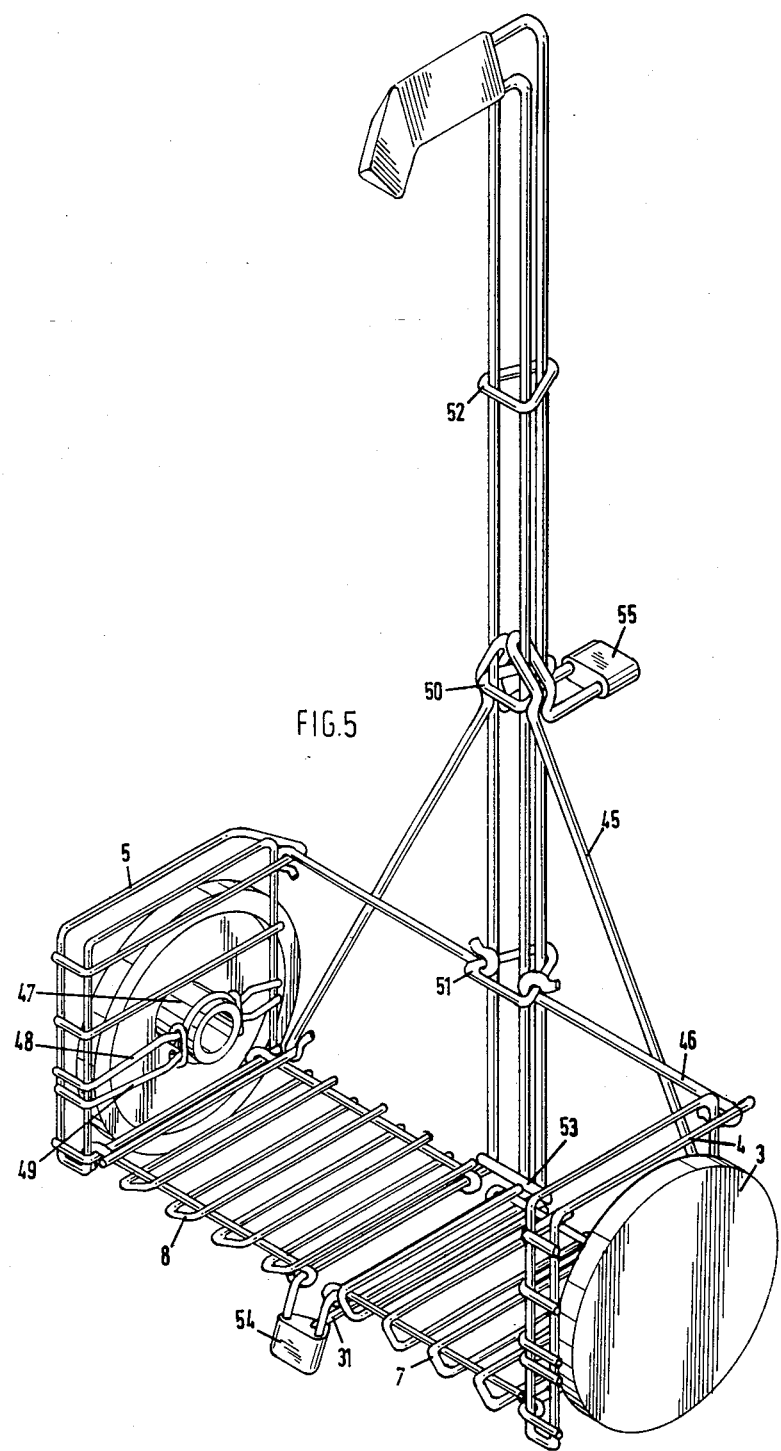

FIGS. 2a–c show various positions of the caddy shown in FIG. 1 as it is being folded;

FIG. 3 shows the caddy of FIGS. 1 and 2 with a bag thereon;

FIG. 4 shows the caddy illustrated in FIGS. 1 and 2 with a suitcase thereon;

FIG. 5 shows a different embodiment of the caddy according to the invention.

According to the drawings, see in particular FIGS. 1 and 2, a caddy comprises a bottom 1, a rear wall 2, wheel guards 4, 5 with wheels and a handle 6 for pulling or pushing the device.

In order that the caddy may be folded, its bottom consists of two members 7, 8 interconnected by means of a hinge 9. In the embodiment shown in FIGS. 1–4, the caddy is made predominantly of synthetic plastics material. In that embodiment said hinge 9 may also consist of synthetic plastics material, for example polypropylene (FIG. 1b).

At their opposed terminal edges, bottom members 7 and 8 are hinged to wheel guards 4, 5.

The rear wall 2 also consists of two parts 10, 11, which, themselves, are provided with a polypropylene hinge 12, 13, respectively, extending at an angle of 45°. The facing ends of the rearwall members 10, 11 are each hinged to the lower end of handle 6. The distal edges of the rear wall members 10 and 11 are each pivoted to wheel guard 4, 5 respectively, for example by means of a polypropylene hinge.

Wheel guards 4 and 5 each have an offset portion 14, 15, respectively. As shown in FIG. 1, the outwardly offset portions are provided with a grooved projection 16, 17, respectively. As shown for wheel 3 depicted left in FIG. 1, this wheel is provided on the inside with a collar 18, likewise grooved on the inside. The offset portions 16, 17 can thus cooperate with the grooves in collars 18 of wheels 3, employing a resilient ring 19 (also see FIG. 1c).

As further shown in FIG. 1, handle 6 is composed of a plurality of telescoping members 20, 21, 22, 23, 24 and 25. Each of members 21–24 is provided at the top with a resilient projection and at its lower end with a corresponding aperture. Such a system is well-known in the art.

As further shown in the drawing, the top member 25 of the telescopic handle 6 is provided with a hand grip 26, and the bottom member 20 has a plurality of projections 27. The projections 27, formed with through-holes therein, together with projections 28 on rear wall members 10, 11 respectively, form hinges by means of two connecting pins 29, 30. As shown in FIG. 1a, the bottom member 20 of handle 6 is designed to form a stop with the terminal edges of projections 28 in the operative position of the caddy.

The bottom member 20 of the telescoping handle 6 is further provided with a support member 31 which, in the operative position of the caddy, extends under its bottom. This support member may be extensible to form an additional support for the transportation of crates. In the embodiment shown in FIG. 1, the bottom member 20 of the handle is further provided with a second support member 32 with legs 33 each equipped with inward lugs 34. For cooperation with said second support member 32, the bottom member 20 of handle 6 is provided on opposite sides with a small bore 35 (only one of which is visible in the drawing), and with two perpendicular grooves 36, 37. Lugs 34 cooperate with bores 35, and in the operative position, legs 33 cooperate with grooves 36, and in the inoperative position may cooperate with grooves 37.

Referring to FIG. 2, FIG. 2a shows the caddy of FIG. 1 in the operative position; FIG. 2b shows the caddy in the semi-folded position; and FIG. 2c shows the caddy of FIG. 1 in the fully folded position. As best shown in FIG. 2b, the bottom wall members and the rear wall members move towards one another during folding. During these movements, the outward parts of the rear wall members are accommodated in the offset portions 14, 15, respectively, and the adjacent parts of the rear wall members are received in recesses 38, 39, respectively (see FIG. 1) of bottom members 7, 8, respectively. The recesses 38 and 39 may also be formed by offset portions.

As shown in FIG. 3, the caddy according to the invention can be completed by an appurtenant bag 40, taking the form of a hand-carried bag, a tightening cord 41 of which can be connected with handle 26. Bag 40 may be provided with a lockable side pocket 42 in which, as diagrammatically shown in FIG. 3, the caddy can be accommodated when not in use, whereafter the bag can be taken along as a normal hand-carried bag.

As further shown in the drawing, the tops of the wheel guards are of flat configuration, so that (see in particular FIG. 4) the caddy is capable of readily transporting a suitcase 43. In the embodiment shown in this Figure, a bag 44, not further shown, is provided under suitcase 43.

As apparent from the embodiment shown in FIG. 5, the caddy according to the invention may alternatively be made of metal wire. In the same way as in the embodiment illustrated in FIGS. 1-4, the caddy comprises a bottom 1 consisting of two members 7 and 8, a rear wall which on opposite sides is made up of a tie rod 45 and a connecting rod 46, wheel guards 4, 5, and a handle 6. Bottom wall members 7 and 8, respectively, are hinged at one side to bottom support member 31, and at the other side to wheel guards 4, 5. Wheels 3 are provided on the inside with a sleeve member 47, equipped with a groove not shown, arranged for cooperation with two wires 48, 49, curved in the manner shown in the drawing, of the wheel guard.

As stated before, the rear wall members are each constituted by a tie rod 45 and a connecting rod 46. Rods 45 are each connected at one end to the distal ends of bottom members 7, 8, respectively, and at the opposite, curved ends slidingly connected to handle 6.

In the embodiment shown, the handle comprises three steel wires, interconnected by handgrip 26, triangular rings 50, 51, 52 and 53, and a fastening block 54. A similar fastening block 55 is used for interconnecting the top ends of rods 45. The triangular ring 50 serves as a stop for the curved top ends of rods 45, slidingly connected to the handle.

The two other rods 46 are pivoted at their adjacent ends to the triangular ring 51 of handle 6. The distal ends of rods 46 are each pivoted to the to ends of wheel guards 4 and 5, respectively.

When the caddy of FIG. 5 is folded together, wheel guards 4 are moved upwards and towards one another. During this movement the bottom members 7 and 8 pivot about support member 31, rods 46 about the triangular ring 51, and the curved upper ends of rods 45 slide upwardly along handle 6. It will be clear that the device as illustrated in FIG. 5, made of wire, is of considerably greater size in the folded condition than the caddy made of synthetic plastics material, described hereinbefore.

It is finally observed that a large number of alterations and modifications are possible without departing from the scope of the invention.

What we claim is:

1. A foldable, single-axle caddy, comprising a foldable bottom (1) including at least two substantially rigid parts (7, 8) which are interconnected through first hinge means (9), each of the said parts (7, 8) swingingly carrying, through second hinge means, a wheel guard (4, 5) at its lower edge, while each wheel case (4, 5) is hinged through at least third hinge means to a rear wall (10, 11, 45, 46) via the said lower edge of said wheel guard (4, 5), said first and the second hinge means being substantially parallel to each other, while said third hinge means are substantially perpendicular to and disposed behind said first and the second hinge means, and a handle (6) which is connected to said rear walls (10, 11) via a fourth hinge means (29, 30, 51).

2. A folding caddy according to claim 1, characterized in that each of the rear wall members is foldable by itself.

3. A folding caddy according to claim 2, characterized in that each rear wall member includes at least two parts which are foldable about a sloping hinge line which extends at an angle to said second hinge means, so that in the folded condition of the caddy, the bottom members, the rear wall members, and the wheel guards are substantially parallel.

4. A caddy according to claim 1, wherein said handle (6) has a housing (20) comprising said fourth hinge means, said fourth hinge means also including two interspaced hinge pins (29, 30) each one being connected to one of said rear walls (10, 11) substantially parallel to said third hinge means.

5. A caddy according to claim 4, characterised in that said housing (20) has two hinges (27, 28), one each between said rear walls (10, 11) and said housing (20), which are provided with an abutment.

6. A caddy according to claim 4, wherein said housing (20) forms a part of a telescopic rod (21-25).

7. A caddy according to claim 6, further including a hingedly mounted second support (32) at the lower end of said housing (20).

8. A caddy according to claim 6, wherein said wheel guards (4, 5) contain recesses (14, 15) in which the adjoining parts (10, 11) of the rear wall (2) are accommodated when said caddy is in the folded condition.

9. A caddy according to claim 1, further comprising a support (31) at the bottom of said housing (20), which, when said caddy is in the unfolded condition, extends to underneath said bottom (1).

10. A caddy according to claim 9, wherein said support (31) is telescopic.

11. A caddy according to claim 1, wherein the upper sides of each wheel case (4, 5) are at least partly flat to function as bearing surfaces.

12. A caddy according to claim 1, wherein said parts (7, 8) of said bottom (1) contain recesses (38, 39) wherein the respective adjoining rear walls (10, 11) are accommodated when said caddy is in the folded condition.

13. A caddy according to claim 1, wherein said caddy comprises synthetic plastics material and said hinges are made of a flexible synthetic plastics material.

14. A caddy according to claim 1, wherein said caddy comprises metal wire.

15. A caddy according to claim 14, wherein said handle extends as far as the front of the bottom (1), the parts (7, 8) of the bottom (1) being hinged at the forwardly oriented part of said beam (6).

16. A caddy according to claim 14, wherein each part of said rear wall comprises a tie-rod (46) and a coupling rod (45), each said tie rod being hingedly and swivellably connected to one end to the adjoining wheel guard (4, 5) and on the other end to said handle to allow for swiveling and hinging movement when said caddy is folded and unfolded, each said coupling rod being connected on one end to said handle (6) in sliding fashion and on the other end to one of said parts (7, 8) of said bottom (1) in hinged fashion, the ends of said coupling rods (45) which are slidingly attached to said handle (6), in the unfolded operative condition of the caddy, abut at the top against a stop (50) on said handle (6).

17. A caddy according to claim 1, further including a bag attached to said handle (6), said bag being provided with a compartment (42) for accommodating said caddy when in the folded condition.

* * * * *